(12) United States Patent
An et al.

(10) Patent No.: US 7,224,404 B2
(45) Date of Patent: May 29, 2007

(54) REMOTE DISPLAY CONTROL OF VIDEO/GRAPHICS DATA

(75) Inventors: Cheol-hong An, Gyeonggi-do (KR); Do-hyoung Kim, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 730 days.

(21) Appl. No.: 09/917,272

(22) Filed: Jul. 30, 2001

(65) Prior Publication Data
US 2003/0025836 A1 Feb. 6, 2003

(51) Int. Cl.
*H04N 9/74* (2006.01)
*H04N 5/262* (2006.01)

(52) U.S. Cl. ............... 348/584; 348/589; 348/598; 348/600; 348/564; 345/204; 345/630; 345/581; 725/40

(58) Field of Classification Search ............... 348/569, 348/584, 589, 592, 598, 587, 600, 596, 563, 348/564, 565, 578, 722; 345/204, 630, 634, 345/619, 760, 581, 629, 635, 636; 725/39, 725/40, 82, 54, 47, 51
See application file for complete search history.

(56) References Cited

U.S. PATENT DOCUMENTS

| | | | |
|---|---|---|---|
| 5,091,784 A | | 2/1992 | Someya et al. |
| 5,109,279 A | * | 4/1992 | Ando ................. 348/564 |
| 5,243,447 A | | 9/1993 | Bodenkamp |
| 5,519,449 A | | 5/1996 | Yanai et al. |
| 5,621,429 A | * | 4/1997 | Yamaashi et al. .......... 715/803 |
| 5,818,512 A | | 10/1998 | Fuller |
| 5,826,102 A | * | 10/1998 | Escobar et al. .......... 715/500.1 |
| 6,075,528 A | * | 6/2000 | Curtis ................. 715/866 |
| 6,108,042 A | * | 8/2000 | Adams et al. ............. 348/460 |
| 6,175,840 B1 | * | 1/2001 | Chen et al. .............. 715/501.1 |
| 6,247,048 B1 | * | 6/2001 | Greer et al. .............. 709/219 |
| 6,297,797 B1 | * | 10/2001 | Takeuchi et al. ............ 345/467 |
| 6,331,852 B1 | * | 12/2001 | Gould et al. ............... 345/419 |
| 6,351,291 B1 | * | 2/2002 | Asano ..................... 348/564 |

(Continued)

FOREIGN PATENT DOCUMENTS

CA 2147301 10/1995

(Continued)

OTHER PUBLICATIONS

JPO Office Action dated Jan. 18, 2005 of corresponding Japanese Patent Application No. 2002-096786.

(Continued)

*Primary Examiner*—David Ometz
*Assistant Examiner*—Jean W. Desir
(74) *Attorney, Agent, or Firm*—Staas & Halsey LLP

(57) ABSTRACT

A method and apparatus where a source delivers graphics data to a target, which receives and displays the graphics data. The source of the graphics data controls how the graphics data is to be displayed at the target. The source transmits a display control signal prescribing a manner in which the video signal is to be displayed in relation to the graphics data. A target receives the video signal, the graphics signal, and the display control signal, and combines the video signal and the graphics data in the manner prescribed by the display control signal to form a combined display at the target.

86 Claims, 4 Drawing Sheets

U.S. PATENT DOCUMENTS

| | | | |
|---|---|---|---|
| 6,380,945 B1 * | 4/2002 | MacInnis et al. | 345/602 |
| 6,389,075 B2 * | 5/2002 | Wang et al. | 375/240.16 |
| 6,545,722 B1 * | 4/2003 | Schultheiss et al. | 348/552 |
| 6,573,946 B1 * | 6/2003 | Gryskiewicz | 348/600 |
| 6,606,128 B2 * | 8/2003 | Hanafee et al. | 348/563 |
| 6,657,646 B2 * | 12/2003 | Partridge et al. | 345/835 |
| 6,710,817 B2 * | 3/2004 | Oku et al. | 348/569 |
| 6,714,254 B2 * | 3/2004 | Enomoto | 348/564 |
| 6,753,928 B1 * | 6/2004 | Gospel et al. | 348/569 |
| 6,848,075 B1 * | 1/2005 | Becker et al. | 715/501.1 |

FOREIGN PATENT DOCUMENTS

| | | |
|---|---|---|
| CN | 1163688 | 10/1997 |
| EP | 0 695 086 | 1/1996 |
| EP | 0 852 361 | 7/1998 |
| JP | 7-7662 | 1/1995 |
| JP | 7-168547 | 7/1995 |
| JP | 7-184138 | 7/1995 |
| JP | 8-320878 | 12/1996 |
| JP | 10-326091 | 12/1998 |
| JP | 2001-266005 | 9/2001 |
| JP | 2001-356753 | 12/2001 |
| JP | 2002-23719 | 1/2002 |
| WO | 99/38320 | 7/1999 |
| WO | 01/43431 | 6/2001 |

OTHER PUBLICATIONS

Indian Office Action dated Oct. 27, 2006 in Indian Patent Application No. 1038/DEL/2001.

* cited by examiner

REMOTE DISPLAY CONTROL OF VIDEO/GRAPHICS DATA

BACKGROUND OF THE INVENTION

1. Field of the Invention

The present invention relates generally to data exchange and processing thereof; more particularly, the present invention relates to a method and apparatus where a source delivers graphics data to a target, which receives and displays the graphics data, particularly where the source of the graphics data controls how the graphics data is to be displayed at the target.

2. Background of Related Art

Nowadays, a plethora of products exist for receiving and/or displaying video signals, e.g., television broadcasting stations, satellite broadcasting services, video feed services, or the like. These video signal receiver products may range from products that receive and process video signals only in analog form, to products that receive and process video signals in digital form, and to products that are capable of receiving and processing video signals in analog and digital form. Some products are equipped with other integrated features, e.g., recording capabilities, or the like. The available features for displaying (e.g., picture-in-picture (PIP), picture-in-graphics (PIG), double screen, or the like) the video signal also vary widely among the products.

There are equally diverse products or sources for delivering the video signals, e.g., over-the-air broadcasting stations, cable operators, direct satellite services, live video feed services, or the like. Many of these sources send, in addition to the video signals, graphics data to be displayed at a receiver for providing programming guide, advertisement, value added services (e.g., stock quotes, news service, etc.), or the like. Graphics data can be in any visual form, e.g., a text, a still picture, an interactive menu screen, or the graphics data may itself be another video stream.

For example, FIG. 1A shows a conventional video/graphics data transmission and reception arrangement 100, where a source of video signal, an AV source 101 sends graphics data together with the video signal to a receiver product, e.g., an AV target 102. Conventionally, the graphics data and video signal are combined by a mixer 104 in the AV target 102, and the combined signal is sent to a display 103, which provides a display of the graphics data and/or the video to a viewer.

However, in the conventional video/graphics data transmission and reception system thus described, because the A/V source 101 does not send information regarding how the video and graphics data are to be combined, the A/V target 102 must decide how the graphics data is to be displayed, particularly in relation to the video signal, which may be simultaneously displayed with the graphics data. Thus, the mixer 104 combines the received video signal and the graphics data without knowing how the source of the graphics data, e.g., the A/V source 101, intended to display the graphics data. The mixer 104 typically resorts to the most simple method of combining the two signals, e.g., simple overlaying, even if the AV target 102 is capable of more advanced display features, e.g., the PIP, PIG, Double Screen, or the like.

Specifically, in the case of a digital television (DTV), which may be, e.g., connected to a set-top-box (STB) via an IEEE1394 serial interface (as specified by "IEEE 1394, Standard for High Performance Serial Bus", published 1995, which is incorporated herein by reference), the DTV receives the graphics data and the video signal (i.e., an MPEG transport stream) from an STB. The transmission of the video signal and the graphics data is governed by standards, e.g., in the United States, The Electronics Industries Alliance (EIA) Standards, EIA-775-A, "DTV 1394 Interface Specification," published April 2000, and/or EIA-799, "On Screen Display Specification," published June 1999, both of which are incorporated herein by reference. Because these standards do not provide means for the STB to send control information with respect to the manner in which the graphics combined with the video signal or by itself are to be displayed, the task of deciding how the two displays are to be proportioned and combined with respect to each other is nevertheless still left up to the receiver product, i.e., the DTV.

The existing standards at best provide overlaying the graphics data display over the video display by allowing specifications of "pixel definition," which may define the location, size, and gain factors of pixels for the graphics data, and thereby allow simultaneous display and blending of the two displays, i.e., by attenuating the graphics data so as to make the graphics data appear somewhat transparent in the foreground with the video display visible in the background. The pixel definition, however, is part of the graphics data, and does not define the relationship between the video display and the graphics display. Moreover, these conventional systems heretofore do not allow the source of the graphics data to specify how the video display is to be proportioned in relation to the graphics data display. Accordingly, despite the fact that many conventional digital television sets are capable of advanced display features, e.g., the PIP, PIG, Double Screen, chroma keying, color keying, or the like, these features are not utilized to allow the DTV to know how the graphics data is intended to be displayed. Thus, the DTV in a conventional system typically performs a simple overlaying of one display, e.g., the graphics, over the other display, e.g., the video signal, and the graphics data/video signal is displayed as shown in FIGS. 1A and 1B.

Thus, the receiver product may display 105 only the graphics data over the entire screen as shown in FIG. 1B, or at best simultaneously display 106, 107 the graphics data and the video signal in a manner in which the graphics display covers, and thus, obscuring a portion of the video display as shown in FIG. 1C.

The above-described conventional graphics/video transmission and display method and system do not utilize available display features of the receiver/display product, and thus, do not provide the most effective and the most user-friendly display of the graphics/video.

Moreover, the conventional method and system heretofore does not allow the source of the graphics data, which can determine a most desirable way in which the graphics data is to be displayed to specify how the graphics data display is to be proportioned with respect to the video display to be presented to a viewer.

Thus, there is a need for a system and method of transmitting and displaying graphics data that allow a user-friendly display of graphics data with the most efficient utilization of the display capabilities of the receiver/display product.

There is also a need for a system and method of transmitting and displaying graphics data that allow the source of the graphics data to determine, at least in part, how the graphics data is to be proportioned in relation to the video display and ultimately displayed to a viewer.

SUMMARY OF THE INVENTION

Various objects and advantages of the invention will be set forth in part in the description that follows and, in part, will be obvious from the description, or may be learned by practice of the invention.

In accordance with the principles of the present invention, an apparatus transmitting a video signal and graphics data to a target device includes a controller generating a display control signal prescribing a manner in which said video signal is to be displayed in relation to said graphics data in a combined display and transmitting said display control signal to said target device, said combined display to be formed by combining said video signal and said graphics data at said target device based on said display control signal.

In addition, in accordance with the principles of the present invention, an apparatus displaying a video signal and graphics data received from a source, includes: a mixer combining said video signal and said graphics data to form a combined display; and a processing unit receiving a display control signal from said source, to control said mixer by prescribing a manner in which said video signal is to be displayed in relation to said graphics data in said combined display.

In accordance with yet another aspect of the principles of the present invention, a system displaying a video signal and graphics data, includes: a source of said video signal and said graphics data, said source transmitting a display control signal prescribing a manner in which said video signal is to be displayed in relation to said graphics data; and a target receiving said video signal, said graphics signal, and said display control signal, and combining said video signal and said graphics data in said manner prescribed by said display control signal to form a combined display at said target.

In accordance with still yet another aspect of the principles of the present invention, a method of transmitting a video signal and graphics data from a source to a target, includes: sending a display control signal from said source to said target, said display control signal prescribing a manner in which said video signal is to be displayed in relation to said graphics data within a combined display formed by combining said video signal and said graphics data at said target.

In accordance with yet another aspect of the principles of the present invention, a computer readable storage medium is provided having stored thereon a computer program for implementing a method of transmitting a video signal and graphics data from a source to a target, said computer program including a process of: sending a display control signal from said source to said target, said display control signal prescribing a manner in which said video signal is to be displayed in relation to said graphics data within a combined display formed by combining said video signal and said graphics data at said target.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

For illustrative purposes, the principles of the present invention are described by referring to exemplary embodiments, particularly, with references to an example in which an implementation of the invention is shown in which the source of graphics data, for instance, a set-top-box and a receiver, for instance, a television set, are connected and communicate via an IEEE1394 serial interface. However, one of ordinary skill in the art would readily recognize that the same principles are equally applicable to, and can be implemented using any other types of graphics data sources and receivers communicating via other interface means, and that any such variation would be within such modifications that do not depart from the true spirit and scope of the present invention.

In accordance with an exemplary embodiment of the present invention, a source of a video signal, which may be a broadcasting program, movies, or the like, may also send graphics data to be displayed together with the video signal to a target device. The graphics data represents information, which may be in any visual form, e.g., texts, still pictures, interactive menus, video streams, or the like, and may be related or unrelated to the video signal. The source of the video signal also sends control information relating to how the graphics data is to be displayed in relation to the display of the video signal. By way of an example, the video signal source may provide the relative sizes and proportions of the graphics data display and the video signal display in, e.g., a picture-in-graphics (PIG), a double screen display, or the like.

In accordance with a particular aspect of the present invention, the source may query the target for the display capabilities of the target, and, accordingly, send appropriate control signals that efficiently utilize the available display feature(s) of the target.

Figure 2A:
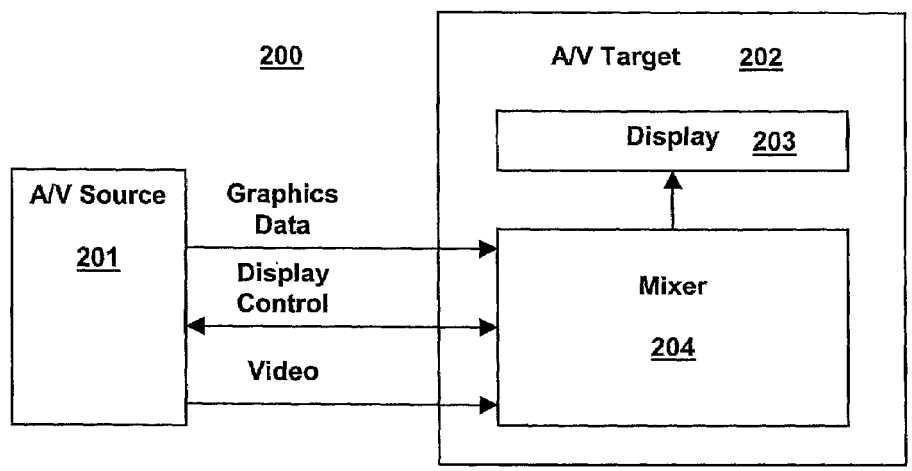
FIG. 2A shows a graphics data transmission/display system, in accordance with an exemplary embodiment of the present invention.

FIG. 2A shows the relevant portions of a graphics data transmission/display system in accordance with an exemplary embodiment of the present invention. As shown, the graphics data transmission/display system 200 includes an A/V source 201, which provides the graphics data and the video signal to an A/V target 202 via any communication unit known to those in the art. In addition, the A/V source 201 may include a controller (not shown), which may be any microprocessor, micro-controller, or the like well known in the art, which generates a display control signal representing information regarding how the graphics data and the video signal are to be output to and displayed by the A/V target 202. The display control signal may include, e.g., an identification of a display feature (e.g., PIG, PIP, double screen, or the like) to be utilized for displaying the graphics data and the video signal, respective relative sizes and/or proportions of the graphics data and video displays, or the like.

In accordance with an exemplary embodiment of the present invention, the A/V source 201 may receive from the A/V target 202 information regarding display capabilities, e.g., a screen size, resolution, or the like, and/or available display features, e.g., PIG, PIP, double screen, color and/or chroma keying, or the like, of the A/V target 202. The information may be provided by the A/V target 202 upon a request from the A/V source 201, or the information may be automatically sent by the A/V target 202, e.g., periodically, or upon a predetermined event, e.g., during a reset/power up, upon an initial connections between the A/V source 201 and the A/V target 202, or the like. The A/V source 201 processes the information received from the A/V target 202 to generate appropriate display control signals to the A/V target 202 that best suit the capabilities and/or features of the A/V target 202 according to the graphics data and the video signal also provided to the A/V target 202, thereby providing the most user-friendly and efficient display to a viewer. Specifically, the source 201 determines a composite format of the video signal and the graphics data and the size of a screen to be displayed using the information received from the target 202. For instance, if the size and the resolution of a display unit or a screen at the A/V target 202 (DTV) are 60 inches and 1920×1200, respectively, and the double screen function is supported, the source 201 refers to this information to generate an appropriate composite screen of the video signal and the graphics data that best suits the screen size and resolution of the A/V target 202. In this instance, the screen composition is the same as that of FIG. 2C, to be later described.

In one embodiment of the present invention, the information received from the A/V target 202 is stored in a storage unit (not shown) in the A/V source 201, and thus, need not be queried each time a particular graphics data is sent to the A/V target 202. In accordance with another aspect of the present invention, the information may be updated from time to time, e.g., periodically or upon a prompt by the A/V target 202 when any of the capabilities and/or features of the A/V target 202 are changed.

A mixer 204 receives the video signal, graphics data and the display control signal, and combines the video signal and the graphics data to form a composite signal according to the display control signal, and the mixer 204 sends the composite signal to a display unit or screen 203, which displays the composite video and graphics to a viewer/user of the A/V target 202.

Although the example shown in FIG. 2A shows three distinct signal paths for the video signal, graphics data, and the display control signal, it should be readily apparent that the signals may be transmitted using any transmission method, e.g., over a serial communication/transmission line. In one embodiment of the present invention, the video signal, graphics data, and the display control signal is sent over a serial interface, e.g., an IEEE1394 serial interface, as packet(s) of bits as is familiar to those skilled in digital communications. In addition, a packet may include any combination of the video signal, graphics data and the display control signal, or in the alternative, each of the video signal, graphics data and the display control signal each include a separate and distinct packet.

Figure 1A:
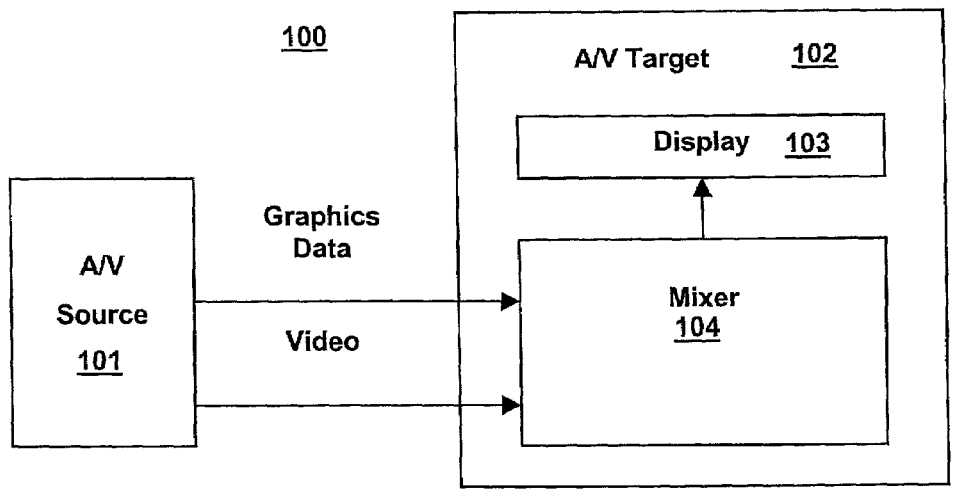
FIG. 1A shows an example of a conventional graphics data transmission/display system.
Figure 1B:
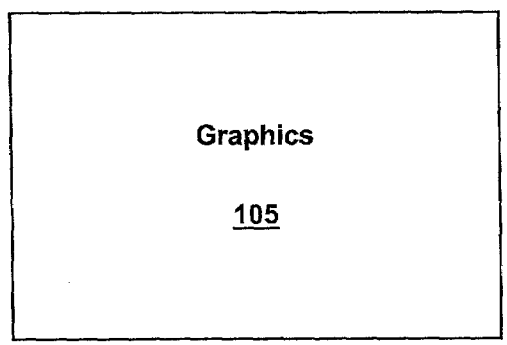
FIG. 1B shows an example of a conventional display screen displaying graphics data in which the graphics data takes up the entire screen.
Figure 1C:
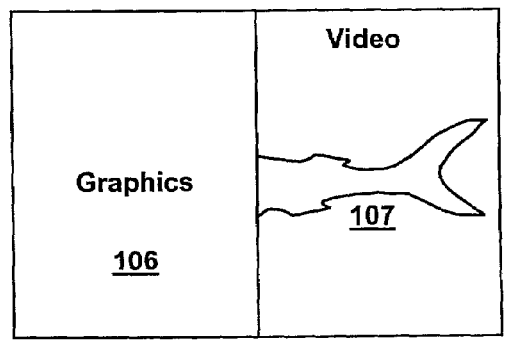
FIG. 1C shows an example of a conventional display screen displaying the graphics data in which the graphics data display is superimposed over the video display, obscuring at least a portion of the video display.
Figure 2B:
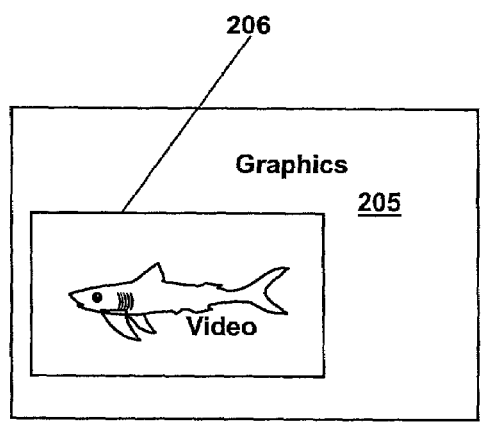
FIG. 2B shows a display screen displaying the graphics data in which a picture-in-graphics (PIG) display capability of a receiver is utilized, in accordance with an exemplary embodiment of the present invention.
Figure 2C:
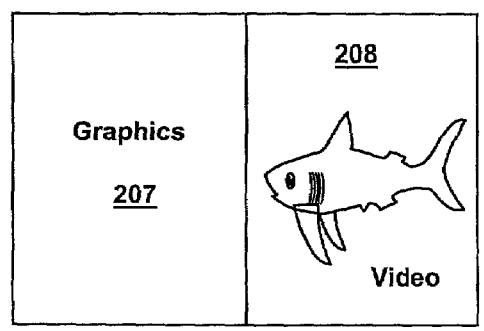
FIG. 2C shows a display screen of the graphics data in which a double screen display capability of the receiver is utilized, in accordance with an exemplary embodiment of the present invention.

FIG. 2B and illustrate some of the advantages of the present invention. FIG. 2B illustrates the display unit 203 displaying the graphics data produced by the A/V source 201 enabling the picture-in-graphics (PIG) feature through the display control signals. In contrast to FIG. 1B, graphics data 205 and video data 206 are simultaneously displayed, and at the same time, the size and/or position of the video display window is set according to the display control signals from the A/V source 201. In accordance with an aspect of the present invention, the video data 206 may be presented as a viewer selectable icon, which, when selected causes the video data 206 to appear on the screen, FIG. 2C illustrates a display unit 203 displaying the graphics data produced by the A/V source 201 enabling the double screen feature of the A/V target 202 through the display control signals from the A/V source 201. In contrast to FIG. 1C, a display simultaneously displays the entire graphics data 207 and video data 208 in respective portions of the display unit 203 without the graphics data 207 obscuring portions of the video data 208, thereby allowing the viewer to appreciate the entire content of the video data 208.

As can be appreciated, the system in accordance with the principles of the present invention as thus far described, allows the A/V source 201 to process and define how the graphics data is to be displayed in relation to the video signal. As a result, the A/V source 201 provides a viewer-friendly display and/or graphical user interface (GUI), which allow efficient use of the display capabilities and/or display features of the A/V target 202.

Further features and advantages of the present invention will now be described referring now to FIGS. 3 and 4, which illustrate an exemplary embodiment of the present invention in which the source of the video/graphics is a set-top-box (STB) and the A/V target is a digital television set (DTV).

Figure 3:
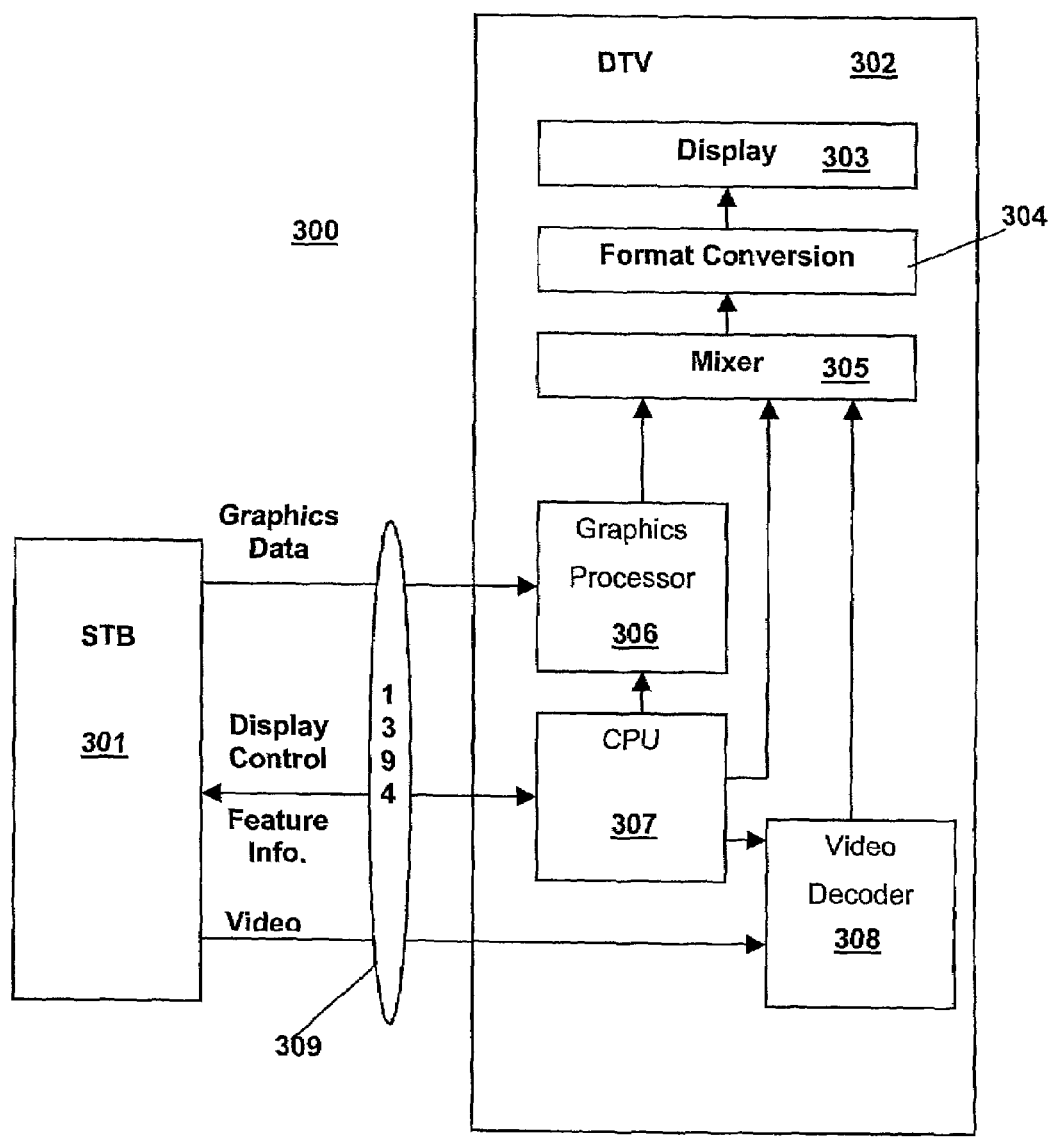
FIG. 3 shows the graphics data transmission/display system shown in FIG. 2, in which an A/V source and an AV target are connected to each other via an IEEE1394 serial bus, in accordance with an exemplary embodiment of the present invention.

A system 300 shown in FIG. 3 includes an STB 301 and a DTV 302, communicating with each other via an IEEE1394 serial interface 309. Although in this example, the IEEE1394 interface is described, it should be readily apparent to and understood by one of ordinary skill in the art that any communication interface, standard and/or protocol, may be used without departing from the true spirit and scope of the present invention. Communication between the STB 301 and the DTV 302 may be governed by The Electronics Industry Association (EIA) Standards, EIA-775A and/or EIA-799, by way of example and not as a limitation.

The STB 301 receives from the DTV 302 via the IEEE1394 serial interface, feature information that provides information regarding display capabilities and features of the DTV 302. The STB 301 sends to the DTV 302 the graphics data, the video signal (e.g., an MPEG-2 transport stream), and the display control signal, which is based on the display features and/or the display capabilities of the DTV 302 received therefrom.

The DTV 302 may further include a video decoder 308 for decoding the received video signal to produce a decoded video signal. By way of example, the video decoder 308 may be an MPEG-2 decoder. The graphics data is received and processed by a graphics processor 306, which produces, from the received graphics data, processed graphics data that is compatible in format with the decoded video signal output from the video decoder 308, allowing the processed graphics data to be mixed together with the decoded video signal.

The DTV 302 may further include a mixer 305 that receives the decoded video signal from the video decoder 308 and the graphics data from the graphics processor 306, and combines the two signals to produce a composite video signal. The mixer 305 outputs the composite video signal to a format conversion unit 304, which converts the composite video signal, e.g., from analog to digital, and sends the converted video signal, e.g., RGB, CVBS, Y, C signals, or the like, to a display 303, which displays the video and/or graphics to a viewer.

In addition, the graphics processor 306, the video decoder 308, and the mixer 305 each are controlled by a CPU 307 in the DTV 302, at least in part, based on the display control signal received from the STB 301. The CPU 307 also sends the feature and/or capabilities information of the DTV 302 to the STB 301, e.g., upon a request therefore from the STB 301. The CPU 307 or controller includes a processing unit such as a microprocessor or a like integrated circuit.

An exemplary embodiment of the process in which the system 300 of FIG. 3 may operate will now be further described with reference to FIG. 4. At operation 401, the process begins, e.g., upon initial installation of the STB 301 or alternatively, upon power-up of the STB 301 where memories are cleared, initial flag conditions are set, etc., as is well known in the art. At operation 402, the STB 301 requests and reads the display capabilities and/or the display features information from the DTV 302. In this exemplary embodiment, the request of the display capabilities and/or the display features information may include a <Open Descriptor/Read Descriptor> command available from an AudioNisual Control Transaction Set (AV/C CTS) as defined in The AV/C Digital Interface Command Set General Specification, Version 3.0, published Apr. 15, 1998, which is incorporated herein by reference. In response to the AV/C CTS command, the DTV 302 sends the display capabilities and/or the display features information to the STB 301.

The display capabilities and/or the display features information may include an information block with respect to the display capabilities and features of the DTV 302, and may take the form, e.g., as shown in Table 1 below.

TABLE 1

| Information Block |
| --- |
| Compound_Length |
| Info_Block_Type(0x0000) |
| Primary_Fields_Length |
| Specifier_Id(0000f0) |
| PIG |
| Video min X position |
| Video max X position |
| Video min Y position |
| Video max Y position |
| Video_Size |
| Double Screen |
| Left or Right Enable |
| Chroma Keying |
| Color Keying |

As shown in Table 1, the information block may include a <Compound_Length> field, an <Info_Block_Type> field, and a <Primary_Fields_Length> field, which collectively identifies size and type of the particular information block.

A <Specifier_Id> field includes the identity of the supplier of the information, e.g., the manufacturer of the DTV 302. A field <PIG> indicates whether the DTV 302 supports PIG feature, or if the feature is supported by a PIG standard the DTV 302 follows. A <Video min X position>, a <Video max X position>, a <Video min Y position>, and a <Video max Y position>, together specify a range of a definable position of the screen. A <Video Size> field indicates scale factors, e.g., ½, ⅛, 1/16, and/or the like, supported by the DTV 302. A <Double Screen> field indicates whether the DTV 302 supports a double screen (or split screen) feature. A <Left or Right Enable> field indicates which side of the double screen the video signal is to be displayed. A <Chroma Keying> field and a <Color Keying> field specify whether chroma keying and color keying features, respectively, are supported by the DTV 302, and an appropriate syntax by which applicable color information may be described. It should be readily apparent that the width of each field in the information block may be different from the other fields, and may comprise any number of bits.

Figure 4:
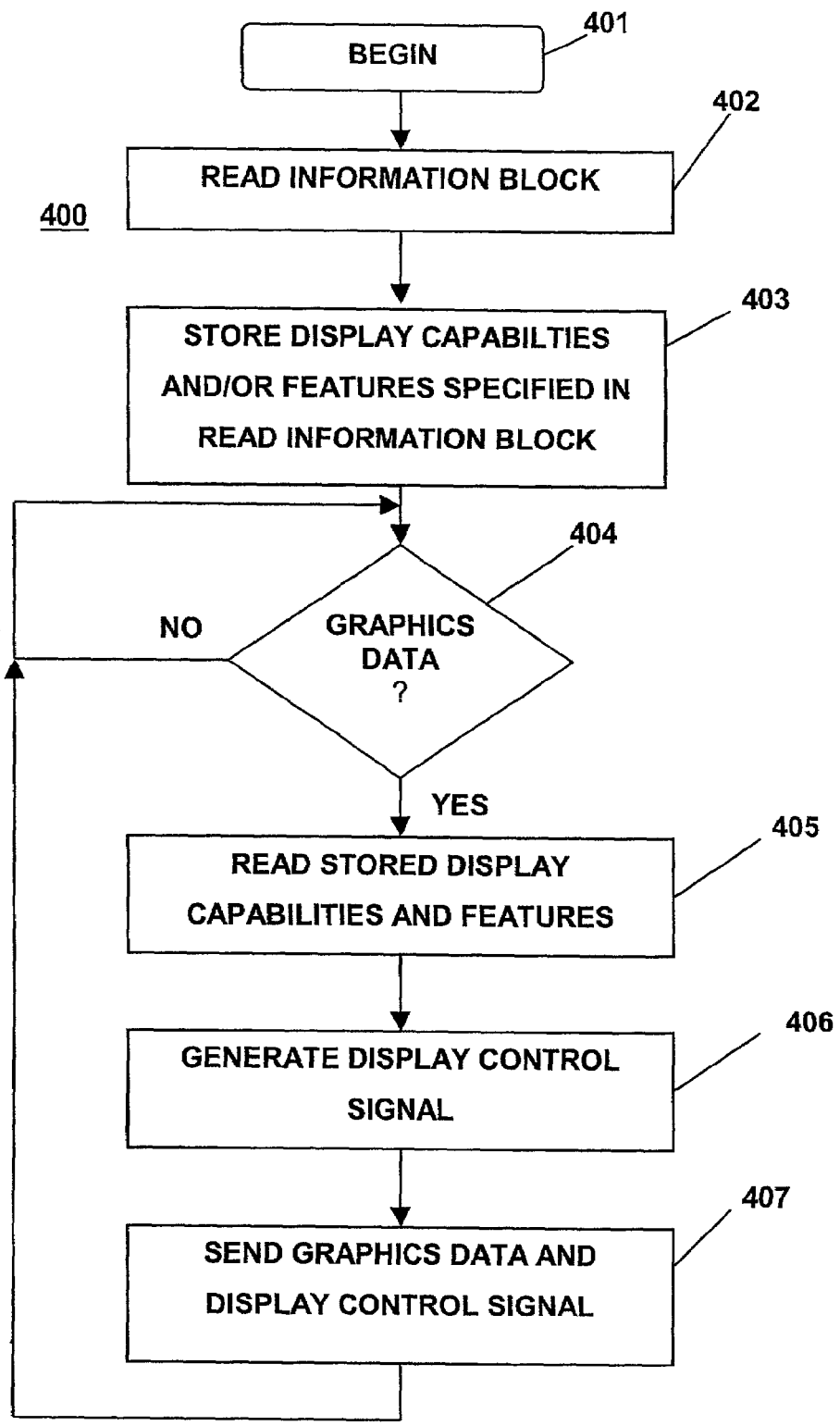
FIG. 4 shows a flow chart depicting a graphics data transmission process, in accordance with an exemplary embodiment the present invention.

Referring to FIGS. 3 and 4, at operation 403, the STB 301 obtains the display capabilities and features of the DTV 302 from the information block received and react, and stores the capabilities/features information in a storage area, e.g., a memory, (not shown) STB 301. At operation 404, the STB 301 determines whether there is graphics data to be sent to the DTV 302. If there is no data to be sent, the process returns to operation 404 until such a time when there is graphics data to be sent.

If at operation 404 it is determined that graphics data is to be sent to the DTV 302, at operation 405, the STB 301 reads the capabilities/features information previously stored in operation 403. At operation 406, STB 301 generates a display control signal that is appropriate based on the nature of the graphics data to be sent and the available display capabilities/features of the DTV 302.

In this exemplary embodiment, the display control signal includes a control command following the syntax of a "vendor dependent command" as provided in the AV/C CTS. It should, however, be understood and readily apparent to those skilled in the art that any other signal providing display control information may be used in place of the above-described command(s). An exemplary embodiment of the control command is shown in Table 2.

TABLE 2

| Display Control Command | |
| --- | --- |
| AV/C CTS(0x0) | Ctype |
| Subunit | Subunit_Id |
| | Opcode(0x00) |
| | Company_Id(0x00) |
| | Company_Id(0x00) |
| | Company_Id(0xf0) |
| | PIG(0x00) |
| | Video X position(0x03) |
| | Video X position(0xE8) |
| | Video Y position(0x02) |
| | Video Y position(0x58) |
| | Video Size(00) |

The control command illustrated in Table 2 is a command that causes the DTV 302 to utilize the PIG feature, to place the video window at the position (1000, 600), and make the size of the video window to be ⅛. More particularly, an <AV/C CTS (0,x0)> field, a <Ctype> field, a <Subunit> field, a <Subunit_Id> field, and an <Opcode(0x00)> field together specify the type, e.g., a vendor dependent type, of the command. A <Company_Id> field identifies the vendor(s) that support the particular command. Two Video X position fields identify the most significant bits and the least significant bits, respectively, of a starting X coordinate of the video window. Two Video Y position fields identify the most significant bits and the least significant bits, respectively, of a starting Y coordinate of the video window. <Video Size> filed specifies a scale factor, shown to be ⅛ in this example, for a video window.

It should be readily apparent to and understood by one of ordinary skill that other commands, e.g., double screen, chroma keying, color keying features or the like, may be provided using the vendor dependent command with the PIG command illustrated above or using any other suitable available commands.

At operation 407, the formulated display control signal, the graphics data, and the video signal are sent to the DTV 302, which displays the video and graphics according to the display control signal received.

Although in this particular embodiment the capabilities/feature information is stored in the set-top-box, it should be readily apparent and understood by those skilled in the art that the storage of the information may not be necessary if the information is obtained, e.g., periodically or even each time graphics data is sent.

While the invention has been described with reference to the exemplary embodiments thereof, those skilled in the art will be able to make various modifications to the described embodiments of the invention without departing from the true spirit and scope of the invention.

What is claimed is:

1. An apparatus transmitting a video signal and graphics data to a target device, comprising:
   a controller generating a display control signal prescribing a manner in which said video signal is to be displayed in relation to said graphics data in a combined display and transmitting said display control signal to said target device, said combined display to be formed by combining said video signal and said graphics data at said target device based on said display control signal, wherein:
   said controller generates said display control signal including a composite format of the video signal and the graphics data based on information received from said target device including display screen size of the target device,
   said apparatus is a set-top-box and said target device comprises a digital television set, and
   said target device displays the combined display on entire display screen based on the composite format of the video signal and graphics data provided in the display control signal.

2. The apparatus transmitting said video signal and said graphics data as recited in claim 1, wherein:
   said controller receives from said target device information comprising at least one of display capabilities and display features of said target device.

3. The apparatus transmitting said video signal and said graphics data as recited in claim 2, wherein:
   said controller queries said target device for said information.

4. The apparatus transmitting said video signal and said graphics data as recited in claim 2, further comprising:
   a storage unit storing said information comprising said at least one of display capabilities and display features received from said target device.

5. The apparatus transmitting said video signal and said graphics data as recited in claim 4, wherein said controller automatically updates said information in said storage unit when the at least one of display capabilities and display features of said target device changes.

6. The apparatus transmitting said video signal and said graphics data as recited in claim 4, wherein said controller updates said information in said storage unit upon receipt of a prompt by said target device when one of the display capabilities and the display features of said target device changes.

7. The apparatus transmitting said video signal and said graphics data as recited in claim 1, wherein said display control signal comprises:
   a command instructing said target device to utilize said at least one of display capabilities and display features available at said target device in said prescribed manner.

8. The apparatus transmitting said video signal and said graphics data as recited in claim 7, wherein said command comprises:
   a vendor dependent command from an Audio Visual Control Transaction Set (AV/C CTS).

9. The apparatus transmitting said video signal and said graphics data as recited in claim 7, wherein said at least one of display capabilities and display features comprises:
   a picture-in-graphics (PIG) feature, said command further comprising information with respect to a starting position and a size of a video portion of said combined display.

10. The apparatus transmitting said video signal and said graphics data as recited in claim 7, wherein said at least one of display capabilities and display features comprises:
    a double screen feature dividing a display unit of said target into sub-screens, said command further comprising information indicating in which of said sub-screens a video portion of said combined display is to be displayed.

11. The apparatus transmitting said video signal and said graphics data as recited in claim 7, wherein said at least one of display capabilities and display features comprises:
    a chroma keying feature, said command further comprising information with respect to a color of said video signal to be replaced by said graphics data.

12. The apparatus transmitting said video signal and said graphics data as recited in claim 7, wherein said at least one of display capabilities and display features comprises:
    a color keying feature, said command further comprising information with respect to a color of said graphics data to be replaced by said video signal.

13. The apparatus transmitting said video signal and said graphics data as recited in claim 1, wherein:
    said video signal, said graphics data, and said display control signal are sent to said target device via an IEEE1394 serial interface.

14. The apparatus transmitting said video signal and said graphics data as recited in claim 13, wherein:
    said video signal, said graphics data, and said display control signal each are sent as a packet of data.

15. The apparatus transmitting said video signal and said graphics data as recited in claim 13, wherein:
    said display control signal comprises a packet of data separate and distinct from said packet of data of said video signal and said graphics data.

16. The apparatus transmitting said video signal and said graphics data as recited in claim 1, wherein:
    said video signal comprises an MPEG-2 transport stream.

17. The apparatus transmitting said video signal and said graphics data as recited in claim 1, wherein:
   said controller periodically receives from said target device information comprising at least one of display capabilities and display features of said target device.

18. An apparatus displaying a video signal and graphics data received from a source, comprising:
   a mixer combining said video signal and said graphics data to form a combined display; and
   a processing unit receiving a display control signal from said source, to control said mixer by prescribing a manner in which said video signal is to be displayed in relation to said graphics data in said combined display, wherein said processing unit sends information with respect to at least one of display capabilities and display features of said target device to said source,
   wherein said display control signal includes a composite format of the video signal and graphics signal and said processing unit controls the mixer to display the combined display on entire display screen, and
   wherein said apparatus comprises a digital television set and said source comprises a set-top-box.

19. The apparatus displaying said video signal and said graphics data as recited in claim 18, wherein:
   said processing unit sends said information upon receipt of a request from said source.

20. The apparatus displaying said video signal and said graphics data as recited in claim 18, wherein said information comprises:
   an indication of available display features of said apparatus comprising at least one of a picture-in-graphics feature, a double screen feature, a chroma keying feature, and a color keying feature.

21. The apparatus displaying said video signal and said graphics data as recited in claim 20, wherein:
   said information indicates whether said picture-in-graphics feature is supported by said apparatus, said information further comprising display capabilities of said apparatus comprising screen size, resolution, and allowable locations of a screen in which said video signal is to be displayed when said picture-in-graphics feature is supported by said apparatus.

22. The apparatus displaying said video signal and said graphics data as recited in claim 20, further comprising a display screen displaying said combined display.

23. The apparatus displaying said video signal and said graphics data as recited in claim 22, wherein:
   said information indicates whether said double screen feature of dividing said display screen into sub-screens is supported by said apparatus, said information further comprising a field of available sub-screens in which said video signal is to be displayed when said double screen feature is supported by said apparatus.

24. The apparatus displaying said video signal and said graphics data as recited in claim 20, wherein:
   said information indicates whether said chroma keying feature is supported by said apparatus, said information further comprising a field of allowable syntax by which an applicable color is described when said chroma keying feature is supported by said apparatus.

25. The apparatus displaying said video signal and said graphics data as recited in claim 20, wherein:
   said information indicates whether said color keying feature is supported by said apparatus, said information further comprising a field of allowable syntax by which an applicable color is described when said color keying feature is supported by said apparatus.

26. The apparatus displaying said video signal and said graphics data as recited in claim 18, wherein:
   said mixer receives said video signal, said graphics data, and said display control signal from said source via an IEEE1394 serial interface.

27. The apparatus displaying said video signal and said graphics data as recited in claim 26, wherein:
   said video signal comprises an MPEG-2 transport stream.

28. The apparatus displaying said video signal and said graphics data as recited in claim 27, further comprising:
   a video decoder coupled to said mixer and said controller, said video decoder receiving and decoding said MPEG-2 transport stream, and outputting a decoded video signal indicative thereof to said mixer.

29. The apparatus displaying said video signal and said graphics data as recited in claim 28, further comprising:
   a graphics processor coupled to said mixer and said controller, said graphics processor receiving and processing said graphics data, and outputting a processed graphics data indicative thereof to said mixer.

30. A system displaying a video signal and graphics data, comprising:
   a source of said video signal and said graphics data, said source transmitting a display control signal prescribing a manner in which said video signal is to be displayed in relation to said graphics data; and
   a target receiving said video signal, said graphics signal, and said display control signal, and combining said video signal and said graphics data in said manner prescribed by said display control signal to form a combined display at said target,
   wherein said source receives from said target information comprising at least one of display capabilities and display features of said target,
   wherein said display control signal includes a composite format of the video signal and graphics signal based on information received from said target,
   wherein said target device displays the combined display on entire display screen based on the composite format of the video signal and graphics data provided in the display control signal, and
   wherein said source comprises a set-top-box digital television and said target comprises a digital television set.

31. The system displaying said video signal and said graphics data as recited in claim 30, wherein:
   said target further provides said information based upon a query by said source.

32. The system displaying said video signal and said graphics data as recited in claim 30, wherein said information comprises:
   available display features of said target comprising at least one of a picture-in-graphics feature, a double screen feature, a chroma keying feature, and a color keying feature.

33. The system displaying said video signal and said graphics data as recited in claim 32, wherein said information
   indicates whether said picture-in-graphics feature is supported by said target, said information further comprising display capabilities of said target comprising screen size, resolution, and allowable locations of a screen in which said video signal is to be displayed when said picture-in-graphics feature is supported by said target.

34. The system displaying said video signal and said graphics data as recited in claim 32, wherein:
   said target further comprises a display screen displaying said combined display.

35. The system displaying said video signal and said graphics data as recited in claim 34, wherein:
said information indicates whether said double screen feature of dividing said display screen into sub-screens is supported by said target, said information further comprising a field of available sub-screens in which said video signal is to be displayed when said double screen feature is supported by said target.

36. The system displaying said video signal and said graphics data as recited in claim 32, wherein:
said information indicates whether said chroma keying feature is supported by said target, said information further comprising a field of allowable syntax by which an applicable color is described when said chroma keying feature is supported by said target.

37. The system displaying said video signal and said graphics data as recited in claim 32, wherein:
said information indicates whether said color keying feature is supported by said target, said information further comprising a field of allowable syntax by which an applicable color is described when said color keying feature is supported by said target.

38. The system displaying said video signal and said graphics data as recited in claim 30, wherein:
wherein said set-top-box and said digital television set communicate with each other via an IEEE1394 serial interface.

39. The system displaying said video signal and said graphics data as recited in claim 38, wherein: said video signal comprises an MPEG-2 transport stream.

40. The system displaying said video signal and said graphics data as recited in claim 39, wherein said target further comprises:
a video decoder coupled to said mixer and said controller, said video decoder receiving and decoding said MPEG-2 transport stream and outputting a decoded video signal indicative thereof to said mixer.

41. The system displaying said video signal and said graphics data as recited in claim 40, wherein said target further comprises:
a graphics processor coupled to said mixer and said controller, said graphics processor receiving and processing said graphics data, and outputting a processed graphics data indicative thereof to said mixer.

42. The system displaying said video signal and said graphics data as recited in claim 30, wherein said source further comprises:
a storage unit storing said information received from said target.

43. The system displaying said video signal and said graphics data as recited in claim 30, wherein:
said source generates said display control signal based on said information received from said target.

44. The system displaying said video signal and said graphics data as recited in claim 43, wherein said display control signal comprises:
a command instructing said target to utilize said at least one of display capabilities and display features available at said target in a prescribed manner.

45. The system displaying said video signal and said graphics data as recited in claim 44, wherein said command comprises:
a vendor dependent command available from an Audio Visual Control Transaction Set (AV/C CTS).

46. The system displaying said video signal and said graphics data as recited in claim 44, wherein said at least one of display capabilities and display features comprises:
a picture-in-graphics (PIG) feature, said command further comprises information with respect to a starting position and a size of a video portion of said combined display.

47. The system displaying said video signal and said graphics data as recited in claim 44, wherein said at least one of display capabilities and display features comprises:
a double screen feature dividing a screen of said target into a plurality of sub-screens, wherein said command further comprises information indicating in which of said sub-screens a video portion of said combined display is to be displayed.

48. The system displaying said video signal and said graphics data as recited in claim 44, wherein said at least one of display capabilities and display features comprises:
a chroma keying feature, wherein said command further comprises information with respect to a color of said video signal to be replaced by said graphics data.

49. The system displaying said video signal and said graphics data as recited in claim 44, wherein said at least one of display capabilities and display features comprises:
a color keying feature, wherein said command further comprises information with respect to a color of said graphics data to be replaced by said video signal.

50. A system displaying a video signal and graphics data comprising:
a source of said video signal and said graphics data, said source transmitting a display control signal prescribing a manner in which said video signal is to be displayed in relation to said graphics data; and
a target receiving said video signal, said graphics signal, and said display control signal, and combining said video signal and said graphics data in said manner prescribed by said display control signal to form a combined display at said target,
wherein said source receives from said target information comprising at least one of display capabilities and display features of said target, and
wherein said at least one of display capabilities and said display features comprises an information block with respect to said display capabilities and display features of said target, said information block comprising:
a <Compound_Length> field,
an <Info_Block_Type> field,
a <Primary_Fields_Length> field, wherein said <Compound_Length> field,
<Info_Block_Type> field, and said <Primary_Fields_Length> field identify a type and size of said block,
a <Specifier_Id> field comprising said identity of a supplier of said block,
a <PIG> field indicating one of whether a PIG feature is supported by said target and whether said feature is supported by a PIG standard said target follows,
a <Video min X position>,
a <Video max X position>,
a <Video min Y position>,
a <Video max Y position>, wherein said <Video min X position>, said <Video max X position>, said <Video min Y position>, and said <Video max Y position> specify a range of a definable position of said screen,
a <Video Size> field indicating scale factors supported by said target,
a <Double Screen> field indicating whether a double screen feature or split screen feature is supported by said target,
a <Left or Right Enable> field indicating which side of said double screen said video signal is to be displayed, a <Chroma Keying> field specifying whether chroma keying feature is supported by said target, a <Color Keying> field specify whether color keying feature is supported by said target, and an appropriate syntax by which applicable color is described.

51. A system displaying a video signal and graphics data comprising:

a source of said video signal and said graphics data, said source transmitting a display control signal prescribing a manner in which said video signal is to be displayed in relation to said graphics data; and a target receiving said video signal, said graphics signal, and said display control signal, and combining said video signal and said graphics data in said manner prescribed by said display control signal to form a combined display at said target, wherein said source receives from said target information comprising at least one of display capabilities and display features of said target, wherein said source generates said display control signal based on said information received from said target, wherein a command instructing said target to utilize said at least one of display capabilities and display features available at said target in a prescribed manner, and wherein said command comprises:

an <AV/C CTS (0,0x0)> field, a <Ctype> field, a <Subunit> field, a <Subunit_Id > field, an <Opcode(0x00)> field, wherein said <AV/C CTS (0,x0)> field, said <Ctype> field, said <Subunit> field, said <Subunit_Id > field, and said <Opcode(0x00)> field specify said type of said command, a<Company_Id> field identifying a vendor that supports said particular command, Video X position fields identifying most significant bits and least significant bits of a starting X coordinate of said screen, Video Y position fields identifying a most significant bits and a least significant bits of a starting Y coordinate of said screen, and a <Video Size> filed specifying a scale factor for said screen.

52. A method of transmitting a video signal and graphics data from a source to a target, comprising:

sending a display control signal from said source to said target, said display control signal prescribing a manner in which said video signal is to be displayed in relation to said graphics data within a combined display formed by combining said video signal and said graphics data at said target; and generating said display control signal based on said information received from said target, wherein said display control signal includes a composite format of the video signal and graphics signal based on information received from said target, wherein said target device displays the combined display on entire display screen based on the composite format of the video signal and graphics data provided in the display control signal, wherein said source comprises a set-top-box digital television and said target comprises a digital television set.

53. The method of transmitting the video signal and said graphics data as recited in claim 52, further comprising:

sending, from said target to said source, information comprising at least one of display capabilities and display features of said target.

54. The method of transmitting said video signal and said graphics data as recited in claim 53, further comprising:

sending, from said source to said target, a query to receive said information, and sending said information from said target to said source.

55. The method of transmitting said video signal and said graphics data as recited in claim 53, further comprising:

storing said information in said source.

56. The method of transmitting said video signal and said graphics data as recited in claim 55, further comprising automatically updating said stored information when the at least one of display capabilities and display features of said target device changes.

57. The method of transmitting said video signal and said graphics data as recited in claim 55, further comprising:

receiving a prompt from said target when at least one of the display capabilities and the display features of said target device changes; and updating said stored information based upon receipt of the prompt from said target.

58. The method of transmitting said video signal and said graphics data as recited in claim 54, further comprising:

detecting whether said information indicates that said target supports at least one of a picture-in-graphics feature, a double screen feature, a chroma keying feature, and a color keying feature.

59. The method of transmitting said video signal and said graphics data as recited in claim 58, further comprising:

determining whether said information indicates that said picture-in-graphics feature is supported by said target; and obtaining from said information display capabilities of said target comprising screen size, resolution, and allowable locations of a display screen in which said video signal is to be displayed when said picture-in-graphics feature is supported by said target.

60. The method of transmitting said video signal and said graphics data as recited in claim 58, further comprising:

determining whether said information indicates that said double screen feature of dividing said display screen into sub-screens is supported by said target, said information further comprising a field of available sub-screens in which said video signal is to be displayed when said double screen feature is supported by said target.

61. The method of transmitting said video signal and said graphics data as recited in claim 58, further comprising:

determining whether said information indicates that said chroma feature is supported by said target, said information further comprising a field of allowable syntax by which an applicable color is described when said chroma feature is supported by said target.

62. The method of transmitting said video signal and said graphics data as recited in claim 58, further comprising:

determining whether said information indicates that said color keying feature is supported by said target, said information further comprising a field of allowable syntax by which an applicable color is described when said color keying feature is supported by said target.

63. The method of transmitting said video signal and said graphics data as recited in claim 58, wherein said sending of said display control signal comprises:

sending from said source a command instructing said target to utilize said at least one of display capabilities and display features available at said target in said prescribed manner.

64. The method of transmitting said video signal and said graphics data as recited in claim 63, wherein said command comprises:
   a vendor dependent command available from an Audio Visual Control Transaction Set (AV/C CTS).

65. The method of transmitting said video signal and said graphics data as recited in claim 63, wherein said command comprises:
   a command instructing said target to utilize said picture-in-graphics feature, said command further comprising information with respect to a starting position and a size of a video portion of said combined display.

66. The method of transmitting said video signal and said graphics data as recited in claim 63, wherein said command comprises:
   a command instructing said target to utilize said double screen feature to divide a screen of said display unit into a plurality of sub-screens, said command further comprising information indicating in which of said plurality of sub-screens a video portion of said combined display is to be displayed.

67. The method of transmitting said video signal and said graphics data as recited in claim 63, wherein said one or more command comprises:
   a command instructing said target to utilize said chroma keying feature, said command further comprising information with respect to a color of said video signal to be replaced by said graphics data.

68. The method of transmitting said video signal and said graphics data as recited in claim 63, wherein said command comprises:
   a command instructing said target to utilize said color keying feature, said command further comprising information with respect to a color of said graphics data to be replaced by said video signal.

69. A computer readable storage medium having stored thereon a computer program for implementing a method of transmitting a video signal and graphics data from a source to a target, said computer program comprising a process of:
   sending a display control signal from said source to said target, said display control signal prescribing a manner in which said video signal is to be displayed in relation to said graphics data within a combined display formed by combining said video signal and said graphics data at said target; and
   generating said display control signal based on said information received from said target,
   wherein said display control signal includes a composite format of the video signal and graphics signal based on information received from said target,
   wherein said target device displays the combined display on entire display screen based on the composite format of the video signal and graphics data provided in the display control signal,
   wherein said source comprises a set-top-box digital television and said target comprises a digital television set.

70. The computer readable storage medium as recited in claim 69, further comprising:
   sending, from said target to said source, information comprising at least one of display capabilities and display features of said target.

71. The computer readable storage medium as recited in claim 70, further comprising:
   sending, from said source to said target, a query to receive said information, and
   sending said information from said target to said source.

72. The computer readable storage medium as recited in claim 70, further comprising:
   storing said information in said source.

73. The computer readable storage medium as recited in claim 72, further comprising automatically updating said stored information when the at least one of display capabilities and display features of said target device changes.

74. The computer readable storage medium as recited in claim 72, further comprising:
   receiving a prompt from said target when at least one of the display capabilities and the display features of said target device changes; and
   updating said stored information based upon receipt of the prompt from said target.

75. The computer readable storage medium as recited in claim 70, further comprising:
   detecting whether said information indicates that said target supports at least one of a picture-in-graphics feature, a double screen feature, a chroma keying feature, and a color keying feature.

76. The computer readable storage medium as recited in claim 75, further comprising:
   determining whether said information indicates that said picture-in-graphics feature is supported by said target; and
   obtaining from said information display capabilities of said target comprising screen size, resolution, and allowable locations of a display screen in which said video signal is to be displayed when said picture-in-graphics feature is supported by said target.

77. The computer readable storage medium as recited in claim 75, further comprising:
   determining whether said information indicates that said double screen feature of dividing said display screen into sub-screens is supported by said target, said information further comprising a field of available sub-screens in which said video signal is to be displayed when said double screen feature is supported by said target.

78. The computer readable storage medium as recited in claim 75, further comprising:
   determining whether said information indicates that said chroma feature is supported by said target, said information further comprising a field of allowable syntax by which an applicable color is described when said chroma feature is supported by said target.

79. The computer readable storage medium as recited in claim 75, further comprising:
   determining whether said information indicates that said color keying feature is supported by said target, said information further comprising a field of allowable syntax by which an applicable color is described when said color keying feature is supported by said target.

80. The computer readable storage medium as recited in claim 75, wherein said generating said display control signal further comprises:
   sending from said source a command instructing said target to utilize said at least one of display capabilities and display features available at said target in said prescribed manner.

81. The computer readable storage medium as recited in claim 80, wherein said generating said command further comprises:
   a vendor dependent command available from an Audio Visual Control Transaction Set (AV/C CTS).

82. The computer readable storage medium as recited in claim 80, wherein said command comprises:

command further comprising information with respect to a starting position and a size of a video portion of said combined display.

83. The computer readable storage medium as recited in claim 80, wherein said command comprises:
a command instructing said target to utilize said double screen feature to divide a screen of said display unit into a plurality of sub-screens, said command further comprising information indicating in which of said plurality of sub-screens a video portion of said combined display is to be displayed.

84. The computer readable storage medium as recited in claim 80, wherein said command comprises:
a command instructing said target to utilize said chroma keying feature, said command further comprising information with respect to a color of said video signal to be replaced by said graphics data.

85. The computer readable storage medium as recited in claim 80, wherein said command comprises:
a command instructing said target to utilize said color keying feature, said command further comprising information with respect to a color of said graphics data to be replaced by said video signal.

86. An apparatus transmitting a video signal and graphics data to a target device, comprising:
a controller generating a display control signal prescribing a manner in which said video signal is to be displayed in relation to said graphics data in a combined display and transmitting said display control signal to said target device, said combined display to be formed by combining said video signal and said graphics data at said target device based on said display control signal, wherein:

said controller generates said display control signal including a composite format of the video signal and the graphics data based on information received from said target device including display screen size of the target device, said apparatus is a set-top-box and said target device comprises a digital television set, said set-top-box queries the target device for display capabilities of the target device, said controller generates the display control signal based on the display capabilities of the target device so that the display control signal prescribes the manner in which said video signal is to be displayed in relation to said graphics data in a combined display, and said target device displays the combined display on entire display screen based on composite format of the video signal and graphics data provided in the display control signal.

* * * * *

UNITED STATES PATENT AND TRADEMARK OFFICE
CERTIFICATE OF CORRECTION

PATENT NO. : 7,224,404 B2 Page 1 of 1
APPLICATION NO. : 09/917272
DATED : May 29, 2007
INVENTOR(S) : Cheol-hong An It is certified that error appears in the above-identified patent and that said Letters Patent is hereby corrected as shown below:

Column 15, Line 27, change "(0,0x0)" to --(0,x0)--.

Column 15, Line 29, change "<Subunit_Id >" to --<Subunit_Id>--.

Column 15, Line 32, change "<Subunit_Id >" to --<Subunit_Id>--.

Column 15, Line 34, change "a<Company_Id>" to --a <Company_Id>--.

Column 19, Line 1, before "command further comprising information with respect to" insert --a command instructing said target to utilize said picture-in-graphics feature, said--.

Signed and Sealed this

Thirtieth Day of October, 2007

JON W. DUDAS
*Director of the United States Patent and Trademark Office*